(12) United States Patent
Yang et al.

(10) Patent No.: US 12,538,222 B2
(45) Date of Patent: Jan. 27, 2026

(54) METHOD FOR DETERMINING POWER CONTROL PARAMETER AND TERMINAL

(71) Applicant: VIVO MOBILE COMMUNICATION CO., LTD., Guangdong (CN)

(72) Inventors: Ang Yang, Guangdong (CN); Peng Sun, Guangdong (CN); Jiangwei Yuan, Guangdong (CN); Xiaodong Sun, Guangdong (CN); Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 468 days.

(21) Appl. No.: 17/722,829

(22) Filed: Apr. 18, 2022

(65) Prior Publication Data

US 2022/0240178 A1 Jul. 28, 2022

Related U.S. Application Data

(63) Continuation of application No. PCT/CN2020/121442, filed on Oct. 16, 2020.

(30) Foreign Application Priority Data

Oct. 18, 2019 (CN) .......................... 201910995833.9
Nov. 18, 2019 (CN) .......................... 201911129702.9

(51) Int. Cl.
*H04W 52/02* (2009.01)
*H04W 72/21* (2023.01)
(Continued)

(52) U.S. Cl.
CPC ....... *H04W 52/0203* (2013.01); *H04W 72/21* (2023.01); *H04W 72/23* (2023.01); *H04W 72/27* (2023.01); *H04W 72/54* (2023.01)

(58) Field of Classification Search
CPC . H04W 52/0203; H04W 72/27; H04W 72/21; H04W 72/23; H04W 72/54
See application file for complete search history.

(56) References Cited

U.S. PATENT DOCUMENTS

| 2010/0067496 A1 | 3/2010 | Choi |
| 2013/0188473 A1 | 7/2013 | Dinan |

(Continued)

FOREIGN PATENT DOCUMENTS

| CN | 101352054 A | 1/2009 |
| CN | 103369654 A | 10/2013 |

(Continued)

OTHER PUBLICATIONS

PE2E-Search Machine Translation of WO 2019/095944 A1, published on May 23, 2019.*

(Continued)

*Primary Examiner* — Rafael Pérez-Gutiérrez
*Assistant Examiner* — Gilbert M. Grant
(74) *Attorney, Agent, or Firm* — BROOKS KUSHMAN P.C.

(57) ABSTRACT

A method for determining a power control parameter and a terminal. The method includes: in a case that no target parameter has been configured in power control parameters of a target object, determining a target parameter of the target object in any one of the following manners: determining, based on a target parameter of another object configured by a network device, the target parameter of the target object, where the another object is different from the target object; determining, based on a historical configuration, the target parameter of the target object; and determining, based on protocol specification, the target parameter of the target object; where the target object and the another object are selected from a physical uplink control channel (Continued)

PUCCH, a physical uplink shared channel PUSCH, and a sounding reference signal SRS.

18 Claims, 2 Drawing Sheets

(51) Int. Cl.
   *H04W 72/23* (2023.01)
   *H04W 72/27* (2023.01)
   *H04W 72/54* (2023.01)

(56) References Cited

U.S. PATENT DOCUMENTS

| | | | |
|---|---|---|---|
| 2015/0016317 | A1 | 1/2015 | Park et al. |
| 2019/0044681 | A1 | 2/2019 | Zhang |
| 2019/0357153 | A1 | 11/2019 | Zhang et al. |
| 2020/0178259 | A1 | 6/2020 | Pan et al. |
| 2020/0275379 | A1 | 8/2020 | Sun et al. |
| 2020/0404593 | A1 | 12/2020 | Yao et al. |
| 2021/0136807 | A1* | 5/2021 | Yang .................. H04L 1/18 |
| 2021/0250951 | A1* | 8/2021 | Yang .................. H04L 5/0053 |
| 2022/0322241 | A1* | 10/2022 | Sun .................. H04W 52/10 |
| 2022/0330173 | A1* | 10/2022 | Matsumura .......... H04L 5/0051 |
| 2023/0337210 | A1 | 10/2023 | Pan et al. |

FOREIGN PATENT DOCUMENTS

| | | | | |
|---|---|---|---|---|
| CN | 108112065 | A | 6/2018 | |
| CN | 108702710 | A | 10/2018 | |
| CN | 109302273 | A | 2/2019 | |
| CN | 109392065 | A | 2/2019 | |
| CN | 109495959 | A | 3/2019 | |
| CN | 110167122 | A | 8/2019 | |
| WO | 2018202014 | A1 | 11/2018 | |
| WO | 2019096317 | A1 | 5/2019 | |
| WO | WO-2019095944 | A1 * | 5/2019 | ............... H04L 5/00 |
| WO | 2019159008 | A1 | 8/2019 | |

OTHER PUBLICATIONS

First Office Action for Korean Application No. 10-2022-7016250, dated Oct. 30, 2023, 5 Pages.
Qualcomm Incorporated "Enhancements on Multi-beam Operation" 3GPP TSG-RAN WG1 Meeting #98, Prague, Czech, Aug. 2019, R1-1909273, 19 Pages.
First Office Action for Chinese Application No. 201911129702.9, dated Aug. 25, 2021, 8 Pages.
Second Office Action for Chinese Application No. 201911129702.9, dated Feb. 8, 2022, 8 Pages.
International Search Report and Written Opinion for Application No. PCT/CN2020/121442, dated Jan. 19, 2021, 8 Pages.
Guangdong Oppo Mobile Telecom, "Discussion on Uplink Power Control," 3GPP TSG RAN WG1 #89, Agenda item 7.1.9, May 15-19, 2017, R1-1707728, Hangzhou, China, 2 Pages.
Vivo, "Remaining Issues on NR UL Power Control," 3GPP TSG RAN WG1 #91, Agenda item 7.6.1, Nov. 27-Dec. 1, 2017, R1-1719779, Reno, NV, USA, 6 Pages.
Motorola Mobility et al., "Remaining Details on Non-CA NR UL Power Control," 3GPP TSG RAN WG1 #93, Agenda item 7.1.6.1, May 21-25, 2018, R1-1807278, Busan, Korea, 5 Pages.
First Office Action for Singapore Application No. 11202203985X, dated Feb. 9, 2024, 11 Pages.
1st Chinese Office Action, English Translation.
2nd Chinese Office Action, English Translation.
International Search Report and Written Opinion, English Translation.
CN101352054A, English Abstract and Machine Translation.
CN103369654A, English Abstract and Machine Translation.
CN108112065A, English Abstract and Machine Translation.
CN108702710A, English Abstract and U.S. Equivalent U.S. Pub. No. 2019/0357153.
CN109302273A, English Abstract and Machine Translation.
CN109495959A, English Abstract and U.S. Equivalent U.S. Pub. No. 2020/0275379.
CN110167122A, English Abstract and Machine Translation.
Extended European Search Report for Application No. 20877151.9-1206, dated Nov. 14, 2022, 9 Pages.
Motorola Mobility et al., "Remaining Details on CA-related NR UL Power Control," 3GPP TSG RAN WG1 #92bis, Agenda item 7.1.6.2, May 21-25, 2018, R1-1807279, Busan, Korea, 6 Pages.
Second Office Action for Indian Application No. 202227027679, dated Dec. 9, 2024, 3 Pages.

* cited by examiner

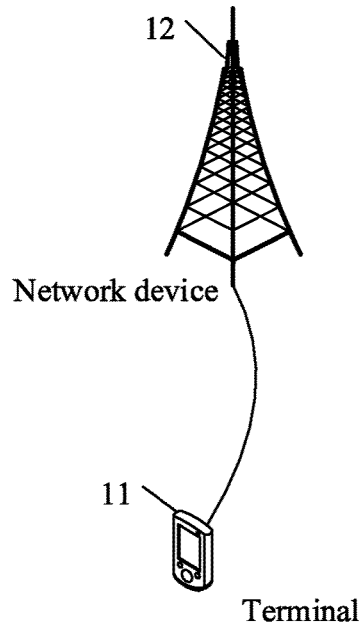

Network device

Terminal

FIG. 1

In a case that no target parameter has been configured in power control parameters of a target object, determine a target parameter of the target object in any one of the following manners:
determining, based on a target parameter of another object configured by a network device, the target parameter of the target object, where the another object is different from the target object;
determining, based on a historical configuration, the target parameter of the target object; and
determining, based on protocol specification, the target parameter of the target object; where
the target object and the another object are selected from a physical uplink control channel PUCCH, a physical uplink shared channel PUSCH, and a sounding reference signal SRS; and the target parameter includes at least one of pathloss reference reference signal, target receive power, path loss compensation factor, and closed-loop power control

METHOD FOR DETERMINING POWER CONTROL PARAMETER AND TERMINAL

CROSS-REFERENCE TO RELATED APPLICATIONS

This application is a continuation application of International Application No. PCT/CN2020/121442 filed on Oct. 16, 2020, which claims priority to Chinese Patent Application No. 201910995833.9, filed on Oct. 18, 2019, and claims priority to Chinese Patent Application No. 201911129702.9, filed on Nov. 18, 2019, which are incorporated herein by reference in their entireties.

TECHNICAL FIELD

The present invention relates to the field of communications technologies, and in particular, to a method for determining a power control parameter and a terminal.

BACKGROUND

It is widely known that in an existing communications system, when a physical uplink control channel (PUCCH), a physical uplink shared channel (PUSCH) or a sounding reference signal (SRS) is being sent, it is usually necessary to perform power control based on power control parameters configured by a network device. The power control parameters usually include parameters such as pathloss reference reference signal (Pathloss Reference RS, PL RS), target receive power, pathloss compensation factor, and closed-loop power control. If any one of the parameters has not been configured by the network device, a terminal (User Equipment, UE) is unable to adjust its uplink transmit power, so that a network loses control over the UE power, likely causing the UE transmit power to be too high or too low and resulting in the UE consuming too much transmit power, an increased intra-cell interference, an increased inter-cell interference, or a reduced system capacity. In this way, the configured power control parameters need to include all parameters, resulting in large resource overheads occupied for power control.

SUMMARY

Embodiments of the present invention provide a method for determining a power control parameter and a terminal.

According to a first aspect, an embodiment of the present invention provides a method for determining a power control parameter, applied to a terminal and including:
in a case that no target parameter has been configured in power control parameters of a target object, determining a target parameter of the target object in any one of the following manners:
determining, based on a target parameter of another object configured by a network device, the target parameter of the target object, where the another object is different from the target object;
determining, based on a historical configuration, the target parameter of the target object; and
determining, based on protocol specification, the target parameter of the target object; where
the target object and the another object are selected from a physical uplink control channel PUCCH, a physical uplink shared channel PUSCH, and a sounding reference signal SRS; and the target parameter includes at least one of pathloss reference reference signal, target receive power, pathloss compensation factor, or closed-loop power control.

According to a second aspect, an embodiment of the present invention further provides a terminal, including:
a determining module configured to, in a case that no target parameter has been configured in power control parameters of a target object, determine the target parameter of the target object in any one of the following manners:
determining, based on a target parameter of another object configured by a network device, the target parameter of the target object, where the another object is different from the target object;
determining, based on a historical configuration, the target parameter of the target object; and
determining, based on protocol specification, the target parameter of the target object; where
the target object and the another object are selected from a physical uplink control channel PUCCH, a physical uplink shared channel PUSCH, and a sounding reference signal SRS; and the target parameter includes at least one of pathloss reference reference signal, target receive power, pathloss compensation factor, or closed-loop power control.

According to a third aspect, an embodiment of the present invention further provides a terminal, including a memory, a processor, and a program stored in the memory and capable of running on the processor, where when the program is executed by the processor, the steps of the foregoing method for determining a power control parameter are implemented.

According to a fourth aspect, an embodiment of the present invention further provides a computer-readable storage medium, where the computer-readable storage medium stores a computer program, and when the computer program is executed by a processor, the steps of the foregoing method for determining a power control parameter are implemented.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a structural diagram of a network system to which an embodiment of the present invention may be applied;

FIG. 2 is a flowchart of a method for determining a power control parameter according to an embodiment of the present invention;

DETAILED DESCRIPTION

Figure 3:
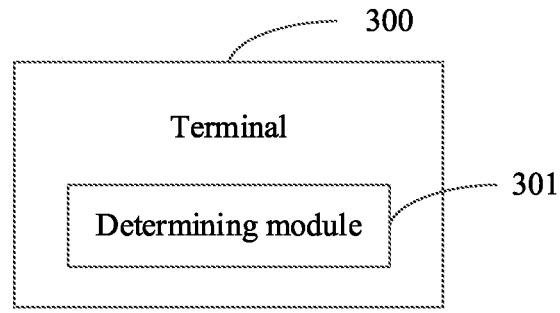
FIG. 3 is a structural diagram of a terminal according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of the present invention, the word such as "for example" is used to represent giving an example, an instance, or an illustration. Any embodiment or design solution described as "for example" in the embodiments of the present invention shall not be interpreted to be more preferential or advantageous than other embodiments or design solutions. To be precise, the terms such as "example" or "for example" are intended to present a related concept in a specific manner.

The following describes the embodiments of the present invention with reference to the accompanying drawings. A method for determining a power control parameter and a terminal provided in the embodiments of the present invention may be applied to a wireless communications system. The wireless communications system may be a 5G system, or an evolved long term evolution (eLTE) system, or a subsequent evolved communications system.

FIG. 1 is a structural diagram of a network system to which an embodiment of the present invention may be applied. As shown in FIG. 1, the network system includes a terminal 11 and a network device 12. The terminal 11 may be a user terminal or another terminal-side device, for example, a mobile phone, a tablet personal computer, a laptop computer, a personal digital assistant (PDA), a mobile Internet device (MID), or a wearable device. It should be noted that a specific type of the terminal 11 is not limited in this embodiment of the present invention. The network device 12 may be a 5G base station, or a base station of a subsequent version, or a base station in another communications system, or is referred to as a NodeB, an evolved NodeB, a transmission reception point (TRP), an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in the embodiments of the present invention, rather than limiting a specific type of the network device.

In wireless communications systems, power control parameters for PUCCH, PUSCH, or SRS include pathloss reference reference signal, target receive power (open-loop receive power target value), pathloss compensation factor and closed-loop power control, and other parameters. The network device needs to configure these power control parameters by using higher layer signaling or physical layer signaling.

In the related art, in a single-transmission reception point (Single-TRP) transmission scenario, all PUCCH resource configuration information of each terminal in radio resource control (RRC) signaling indication information shares a same power control parameter set, including a P0 value set, a pathloss reference reference signal set, and a closed-loop power control process set. All PUCCH resource configuration information of each terminal shares a same space-related information set. An association relationship between the power control parameters and the space-related information is included in configuration information of the space-related information. Therefore, an uplink transmit beam indication mechanism may reuse a power control parameter indication.

For a PUCCH transmission, a media access control control element (MAC CE) may activate a piece of space-related information in the space-related information set to indicate a transmit beam of the PUCCH, and an association relationship between them is preconfigured through RRC signaling. In addition, power parameters used for an actual PUCCH transmission may be obtained through the association relationship between the space-related information and the power control parameters.

The power control parameter set of the physical uplink shared channel, and an association relationship between a SRS resource indicator (SRI) and a power control parameter are configured through RRC signaling. A power used by the terminal for actual PUSCH transmission is indicated by a SRI field in downlink control information (DCI).

The power control parameters of the SRS are configured through RRC signaling, and are configured per SRS resource set.

Each SRS resource set includes at least one SRS resource, and each SRS resource includes space-related information for indicating a transmit beam of the SRS.

The space-related information for a PUSCH is indicated through a SRI in the DCI, each SRI corresponds to one SRS resource, and space-related information included in the SRS resource is used to indicate a transmit beam of the PUSCH.

The terminal may use the power control parameters to adjust uplink transmit power to meet a transmit power requirement. If one or more parameters of these power control parameters have not been configured by the network, the terminal is unable to adjust the uplink transmit power, so that the network loses control over the terminal power, likely causing the terminal transmit power to be too high or too low, and leading to problems such as the terminal consuming too much transmit power, an increased intra-cell interference, an increased inter-cell interference, or a reduced system capacity.

To resolve these problems, default values of these power parameters need to be given. These power control parameters need to be considered separately, because their usage and physical meanings are very different. Therefore, an embodiment of the present invention provides a method for determining a power control parameter. The specific considerations are described in the following.

The pathloss reference reference signal is first considered. The pathloss reference reference signal is a downlink RS. Several aspects need to be considered during selection of a default downlink RS: whether channel conditions from the terminal to the network device are effectively reflected; whether this downlink RS can be detected in as many conditions as possible; whether quasi co-location (QCL) information of this downlink RS is relatively stable and does not change constantly; and how to operate in the face of extreme situations.

Based on the foregoing principles, a physical downlink control channel (PDCCH) and a physical random access channel (PRACH) are initially selected from all channels and RSs.

The PDCCH is a downlink channel playing a control role, and provides one important function of scheduling a PUCCH, a PUSCH or a SRS. Also, a downlink RS is included in QCL information of the PDCCH, and may be used as a candidate for the pathloss reference reference signal. However, there may be a plurality of PDCCHs, and which PDCCH to be used is unclear. That is, one carrier has a plurality of control resource sets (CORESET), and which CORESET to be used is a problem that needs to be resolved. In addition, a current bandwidth part (BWP) may possibly have no CORESET.

Parameters of the PRACH are configured by the network, but the PRACH is an uplink channel. However, particularly in QCL of the PRACH there is always a synchronization signal block (SSB) or a channel state information reference signal (CSI-RS), which are all downlink RSs.

Other channels and RSs, such as a physical downlink shared channel (PDSCH) and a SSB for initial access, have various shortcomings, and cannot be used as a default pathloss reference reference signal. For example, the PDSCH needs a high channel capacity and has a narrow beam, which conflicts with requirements of the PUCCH and SRS; and the PDSCH is often not available, or its channel conditions often change. For example, although the SSB for initial access adopts a wide beam, with the goal of a rate of successful transmission, channel conditions between the terminal and the network are likely to change after a period of time. It is very likely that the beam direction of the SSB for initial access is no longer optimal or even very poor.

However, there is an exception for the foregoing PDSCH. The following describes some exceptional solutions by using examples: for example, in some solutions, when allocating a transmission configuration indicator (TCI) for the PDSCH, a network device first allocates a plurality of TCIs, then activates some of them. As such, the network device uses the TCI with the lowest TCI ID or the highest TCI ID as a special TCI. For example, the TCI corresponds to a beam with good coverage or stability, or a beam with the highest reference signal received power (RSRP). When considering other parameters, that is, parameters such as target receive power, pathloss compensation factor, and closed-loop power control, it is also necessary to find a power related parameter that is always configured by the network. Reference may be made to configurations of the PUCCH and the SRS after initial access message 1 and before RRC configuration. The configuration is definitely to be configured by the network device, aiming at stability of link quality and probability of successful transmission.

Although the SSB for initial access is not suitable, the SSB in which the terminal is located is more suitable, because the terminal considers that the SSB has good performance, and its corresponding beam should be facing the terminal.

Further, if one or two of the PUCCH, PUSCH and SRS are configured with PL RSs, the other one or two configured with no PL RS among the above three may use these configured PL RSs. In addition, some issues also need to be considered, such as whether these PL RSs are activated or updated by a MAC CE and the number of the PL RSs. Based on the above reasons, the following solutions can be obtained.

For example, in some solutions, a PL RS configured by the network for another channel may be used. Further, some issues need to be considered, such as the number of PL RSs and activation or update performed by MAC CEs.

For example, in some solutions, a default downlink RS in the QCL may be used. The RS in the QCL may be either a downlink RS or a SRS. The latter is an uplink RS and may not be used as a pathloss reference reference signal. If the default QCL is a SRS and the SRS is associated with a downlink RS, the downlink RS associated with the SRS is used. More specifically, in many cases, the present invention shows how to find the default QCL.

For example, in some solutions, the network device uses a PDCCH to schedule a dedicated PUCCH (dedicated-PUCCH) or a SRS. The PDCCH has QCL information, so that the downlink RS in the QCL information of the PDCCH may also be used.

For example, in some solutions, the terminal has a CORESET with CORESET identifier 0 (that is, CORESET #0), and may use a downlink RS in the QCL information of the CORESET #0. Certainly, if the current BWP does not have the CORESET #0, it is necessary to find a CORESET #0 of another BWP. If all BWPs of the current carrier do not have a CORESET #0, it is necessary to search in another cell group. However, after searching in this way, there may be a plurality of CORESETs 0, and they need to be sorted, which can be sorted from the perspective of importance, ID sequence, and the like.

For example, in some solutions, a CORESET with the lowest ID of the current BWP (CORESET with lowest ID) may be used. A problem that the current BWP does not have a CORESET may also be encountered, and a solution may be given through derivation similar to the above description.

In some solutions, a downlink RS in QCL of the PRACH may be used. The PRACH is used as a random access channel, and the network device always configures the downlink RS of the PRACH.

When considering other parameters, that is, parameters such as target receive power, pathloss compensation factor, and closed-loop power control, it is also necessary to find a power related parameter that is always configured by the network. Reference may be made to configurations of the PUCCH and the SRS after initial access message 1 and before RRC configuration. The configuration is definitely to be configured by the network device, aiming at stability of link quality and probability of successful transmission, which is a good choice.

Specifically, FIG. 2 is a flowchart of a method for determining a power control parameter according to an embodiment of the present invention. The method is applied to a terminal. As shown in FIG. 2, the method includes the following steps.

Step 201: In a case that no target parameter has been configured in power control parameters of a target object, determine a target parameter of the target object in any one of the following manners:

determining, based on a target parameter of another object configured by a network device, the target parameter of the target object, where the another object is different from the target object;

determining, based on a historical configuration, the target parameter of the target object; and determining, based on protocol specification, the target parameter of the target object; where the target object and the another object are selected from a physical uplink control channel PUCCH, a physical uplink shared channel PUSCH, and a sounding reference signal SRS; and the target parameter includes at least one of pathloss reference reference signal, target receive power, pathloss compensation factor, or closed-loop power control.

In this embodiment, a network device may configure some parameters of the power control parameters for the target object, or may not configure power control parameters. In this case, the terminal may determine, based on a target parameter of another object, a historical configuration and/or protocol specification, a target parameter that has not been configured by the network device.

Specifically, the terminal may determine, based on a target parameter of the another object configured by a network device, a target parameter of the target object, or the terminal may autonomously select a configuration parameter in the historical configuration to determine the target parameter, or the terminal may select, based on the protocol specification, a configuration parameter in the historical configuration to determine the target parameter, or the terminal may directly determine a parameter value specified in the protocol as a target parameter, which will be described in detail in the following embodiments.

It should be understood that, in some embodiments, the pathloss reference reference signal may be referred to as a pathloss reference reference signal or a pathloss reference signal. Optionally, the downlink reference signal (RS) may specifically refer to a channel state information reference signal CSI-RS and/or a synchronization signal block SSB.

Optionally, the PUCCH may be a dedicated PUCCH.

In the embodiments of the present invention, in a case that no target parameter has been configured in power control parameters of a target object, a terminal may determine a target parameter of the target object based on a target parameter of another object, a historical configuration and/or protocol specification. In this way, a requirement of a network device for configuration of power control parameters may be simplified, and resource overheads occupied for power control may be reduced. In addition, flexibility of configuration of the network device is improved.

In an optional embodiment, in a case that the target parameter includes the pathloss reference reference signal, the determining, based on a target parameter of another object apart from the target object, a target parameter of the target object includes:

determining a first pathloss reference reference signal of the another object as a pathloss reference reference signal of the target object.

That is, when the network device has configured PL RS(s) of one or two of the PUCCH, PUSCH, and SRS by using RRC signaling, PL RS(s) of the other one or two that are not configured among the PUCCH, PUSCH, and SRS may be determined based on the configured PL RS(s) of the one or two of the PUCCH, PUSCH, and SRS.

Optionally, the first pathloss reference reference signal is any one of the following:

a pathloss reference reference signal with the lowest identification number in the pathloss reference reference signals of the another object;
a pathloss reference reference signal with the highest identification number in the pathloss reference reference signals of the another object;
a pathloss reference reference signal used on a most recent occasion in the pathloss reference reference signals of the another object;
a pathloss reference reference signal with the lowest identification number activated or updated by a media access control control element MAC CE in the pathloss reference reference signals of the another object;
a pathloss reference reference signal with the highest identification number activated or updated by a MAC CE in the pathloss reference reference signals of the another object; and
a pathloss reference reference signal that is activated or updated by a MAC CE and used on a most recent occasion in the pathloss reference reference signals of the another object.

Optionally, the PL RS of the target object may be alternatively determined based on the number of PL RSs configured by the RRC signaling.

If the number of pathloss reference reference signals of the another object is less than or equal to a preset threshold, the first pathloss reference reference signal is any one of the following:

the pathloss reference reference signal with the lowest identification number in the pathloss reference reference signals of the another object;
the pathloss reference reference signal with the highest identification number in the pathloss reference reference signals of the another object; and
the pathloss reference reference signal used on a most recent occasion in the pathloss reference reference signals of the another object.

If the number of pathloss reference reference signals of the another object is greater than a preset threshold, the first pathloss reference reference signal is any one of the following:

the pathloss reference reference signal with the lowest identification number activated or updated by a MAC CE in the pathloss reference reference signals of the another object;
the pathloss reference reference signal with the highest identification number activated or updated by a MAC CE in the pathloss reference reference signals of the another object; and
the pathloss reference reference signal that is activated or updated by a MAC CE and used on a most recent occasion in the pathloss reference reference signals of the another object.

If the number of pathloss reference reference signals that are activated or updated by a MAC CE and used on a most recent occasion is greater than 1, the first pathloss reference reference signal is any one of the following:

a pathloss reference reference signal with the lowest identification number in the pathloss reference reference signals that are activated or updated by a MAC CE and used on a most recent occasion; and
a pathloss reference reference signal with the highest identification number in the pathloss reference reference signals that are activated or updated by a MAC CE and used on a most recent occasion.

The value of the preset threshold may be 4. Certainly, the value of the preset threshold is not limited to 4, and may alternatively be another value, which may be set according to needs.

Optionally, if the number of the another objects is greater than 1, a pathloss reference reference signal of one or two objects is selected according to preset first priority information as the pathloss reference reference signal of the target object, where the first priority information is obtained in any one of the following manners:

being specified by a protocol;
being configured by a network device; and
being configured by a terminal.

For example, when the network device has configured a PL RS of the PUCCH and a PL RS of the PUSCH, but has not configured a PL RS of the SRS, the PL RS of the SRS may preferentially use the PL RS of the PUCCH, or may preferentially use the PL RS of the PUSCH, or the PL RS of the PUCCH and the PL RS of the PUSCH are in a same priority, or the terminal itself decides priority of the PL RS of the PUCCH and the priority of the PL RS of the PUSCH.

When the network device has configured a PL RS of the PUCCH and a PL RS of the SRS, but has not configured a PL RS of the PUSCH, the PL RS of the PUSCH may preferentially use the PL RS of the PUCCH, or may preferentially use the PL RS of the SRS, or the PL RS of the PUCCH and the PL RS of the SRS are in a same priority, or the terminal itself decides the priority of the PL RS of the PUCCH and the priority of the PL RS of the SRS.

When the network device has configured a PL RS of the PUSCH and a PL RS of the SRS, but has not configured a PL RS of the PUCCH, the PL RS of the PUCCH may preferentially use the PL RS of the PUSCH, or may preferentially use the PL RS of the SRS, or the PL RS of the PUSCH and the PL RS of the SRS are in a same priority, or the terminal itself decides the priority of the PL RS of the PUSCH and the priority of the PL RS of the SRS.

Optionally, the pathloss reference reference signal is associated with a synchronization signal block and a channel state information reference signal. The pathloss reference reference signal of the target object is determined based on preset second priority information. The pathloss reference reference signal of the target object is selected from the synchronization signal block and the channel state information reference signal. The second priority information is obtained in any one of the following manners:
 being specified by a protocol;
 being configured by a network device; and
 being configured by a terminal.

For example, when a RS associated with the PL RS is selected from the SSB and the CSI-RS, the SSB is preferentially selected, or the CSI-RS is preferentially selected, or the terminal itself decides whether to preferentially select the SSB or the CSI-RS.

Optionally, an identifier of the pathloss reference reference signal is any one of the following:
 an identifier SSB-Index of the synchronization signal block SSB;
 an identifier CSI-RS-Index of the channel state information reference signal CSI-RS;
 a PUSCH pathloss reference reference signal identifier PUSCH-PathlossReferenceRS-Id, if the pathloss reference reference signal is a PUSCH pathloss reference reference signal;
 a PUCCH pathloss reference reference signal identifier PUCCH-PathlossReferenceRS-Id, if the pathloss reference reference signal is a PUCCH pathloss reference reference signal;
 a SRS resource identifier SRS-ResourceId, if the pathloss reference reference signal is a SRS pathloss reference reference signal; and
 a SRS resource set identifier SRS-ResourceSetId, if the pathloss reference reference signal is a SRS pathloss reference reference signal.

In an optional embodiment, in a case that the target parameter includes the pathloss reference reference signal, the determining, based on historical configuration and/or protocol specification, the target parameter of the target object includes:
 determining a first RS from historical downlink RSs as the pathloss reference reference signal.

In this embodiment of the present invention, the first RS may be understood as a downlink RS determined to be associated with the pathloss reference reference signal by the terminal. After the first RS is determined, a pathloss may be calculated based on the first RS.

Optionally, the first RS may be determined in a plurality of manners, which are described in detail below. For example, in this embodiment, the first RS is any one of the following downlink RSs:
 a downlink RS in quasi co-location QCL information associated with the target object;
 a fifth RS in a plurality of RSs for determining a transmit beam corresponding to a current resource;
 a SSB in which the terminal is located;
 a RS of a beam used for a current transmission;
 a downlink RS in QCL information of a target physical downlink control channel PDCCH, where the target PDCCH is a PDCCH for scheduling the target object;
 a downlink RS associated with a latest physical random access channel PRACH; and
 a downlink RS associated with a PRACH corresponding to a random access response (RAR), where the random access response RAR is used for scheduling the target object.

In this embodiment, the QCL information includes an identification number of a RS (that is, a RS ID). The RS corresponding to the RS ID is a downlink RS in the QCL information. In other words, the downlink RS in the QCL information may be understood as a downlink RS associated with the QCL information.

This embodiment of the present invention provides a plurality of solutions for determining the first RS. The terminal may use one of the solutions to determine the target parameter that has not been configured by the network device according to actual needs, thereby improving flexibility of determining the target parameter.

It should be understood that the target object is located in a first carrier. In an optional embodiment, the downlink RS in the quasi co-location QCL information associated with the target object includes any one of the following:
 Solution 1: In a case that the first carrier is configured with control resource sets CORESETs, a downlink RS in QCL information of a first CORESET, where the first CORESET is one of the CORESETs configured for the first carrier;
 Solution 2: In a case that the first carrier is configured with no CORESET, and that an active bandwidth part BWP of the first carrier is configured with M TCIs for PDSCH, a downlink RS in a first TCI, where the first TCI is one of the M TCIs, the M TCIs are in an active state, and M is a positive integer;
 Solution 3: In a case that the first carrier is configured with no CORESET, and that an active BWP of the first carrier is not configured with a TCI that is in an activated state, a third RS of a first BWP of a second carrier, where the second carrier is different from the first carrier; and
 Solution 4: In a case that the first carrier is configured with no CORESET, the third RS of the first BWP of the second carrier, where the second carrier is different from the first carrier.

In solution 1, optionally, the first CORESET may include any one of the following:
 a CORESET configured for the first carrier on a most recent occasion; and
 a CORESET with identification number 0 in the CORESETs configured for the first carrier.

Optionally, the CORESET configured for the first carrier on a most recent occasion may include: a CORESET with the lowest identification number or the highest identification number in the CORESETs configured for the first carrier on a most recent occasion. In this embodiment, when configuring a CORESET, the network device usually configures an identification number of the CORESET, that is, the CORE- SET ID. A CORESET with the lowest identification number may be understood as having one identification number with the lowest CORESET ID, and the CORESET with the highest identification number may be understood as having one identification number with the highest CORESET ID. The CORESET with identification number 0 in the CORESETs configured for the first carrier may be CORESET #0 on a most recent occasion.

It should be noted that a beam corresponding to the CORESET with the lowest identification number is often a beam with wide coverage or a relatively stable beam. A beam corresponding to the CORESET with the highest identification number is often a beam that best matches a current channel and has a highest channel RSRP.

Further, in an optional embodiment, the downlink RS in the QCL information of the first CORESET includes:

a second RS in N1 downlink RSs, where N1 is a positive integer, and the N1 downlink RSs are associated with a CORESET configured for an active BWP of the first carrier.

In other words, in this embodiment, one second RS may be selected as a first RS from all downlink RSs associated with the CORESET configured for the active BWP of the first carrier. In an optional embodiment, the second RS may include any one of the following:

a RS with the lowest identification number or the highest identification number, where if the RS is a synchronization signal block SSB, the identification number of the RS is SSB-Index; and if the RS is a channel state information reference signal CSI-RS, the identification number of the SSB is CSI-RS-Index;

in a case that the downlink RS includes SSBs and CSI-RSs, a SSB with the lowest identification number or the highest identification number, where a priority of the SSB is higher than that of the CSI-RS;

in a case that the downlink RS includes SSBs and CSI-RSs, a CSI-RS with the lowest identification number or the highest identification number, where a priority of the SSB is lower than that of the CSI-RS; and a RS that is randomly selected from the N1 downlink RSs.

It should be noted that, in other embodiments, the second RS may also be a downlink RS on a most recent occasion in the N1 downlink RSs.

In solution 2, the first TCI is a TCI with the lowest identification number or the highest identification number in the M TCIs. Certainly, in other embodiments, the first TCI may alternatively be a TCI on a most recent occasion in the M TCIs. Optionally, the TCI includes a RS ID, and a RS corresponding to the RS ID may be understood as a RS in the TCI.

In solution 3, the second carrier includes at least one of a current carrier, a carrier of a primary cell, a carrier with the lowest identification number, or a carrier with the highest identification number. The first BWP includes at least one of an active BWP, an initial BWP, a BWP with the lowest identification number, or a BWP with the highest identification number.

In this embodiment, the third RS includes any one of the following:

a RS in QCL information of a third CORESET, where the third CORESET includes a CORESET with identification number 0, a CORESET with the lowest identification number, a CORESET with the highest identification number, or a CORESET selected by the terminal;

a fourth RS in N2 downlink RSs, where N2 is a positive integer, and the N2 downlink RSs are associated with a CORESET configured for the first BWP; and a downlink RS in a fourth TCI, where the fourth TCI is a TCI with the lowest identification number or the highest identification number in L TCIs that are in an activated state, or a TCI that is recently used in the L TCIs, where L is a positive integer.

It should be noted that, in this embodiment of the present invention, a third CORESET may be selected from BWPs of different carriers according to priorities of the carriers, and a third CORESET is used as an example of CORESET #0 for description.

Specifically, priorities of BWPs of carriers other than the first carrier in a first cell group is higher than priorities of BWPs in a second cell group, where the first cell group is a cell group in which the target object is located, and the second cell group is different from the first cell group.

In this embodiment, the third CORESET is a CORESET configured for the first BWP. Optionally, the fourth RS may be a RS with the lowest RS ID, a RS with the highest RS ID, or a RS selected by the terminal in the N2 downlink RSs. Optionally, the L TCIs may be all TCIs configured for the first BWP, or may be TCIs used for the PDSCH in all TCIs configured for the first BWP, that is, the L TCIs are used for the PDSCH.

It should be noted that, in this embodiment, a RS with the lowest RS ID or the highest RS ID in the N downlink RSs may be selected as the fourth RS according to its priority, specifically:

in a case that the downlink RS includes SSBs and CSI-RSs, a SSB with the lowest identification number or the highest identification number, where a priority of the SSB is higher than that of the CSI-RS;

in a case that the downlink RS includes SSBs and CSI-RSs, a CSI-RS with the lowest identification number or the highest identification number, where a priority of the SSB is lower than that of the CSI-RS.

Specifically, confirmation of the priority may be configured by the network device, or may be specified by a protocol, or may be autonomously determined by the terminal, which will not be further described herein.

Further, in an optional embodiment, the third CORESET may be understood as a CORESET recently configured for the first BWP, where the L TCIs may be understood as TCIs recently configured for the first BWP.

In solution 4, in a case that the first carrier is configured with no CORESET, and that an active BWP of the first carrier is not configured with a TCI that is in an activated state, a third RS of a first BWP of a second carrier is used, where the second carrier is different from the first carrier; or in a case that the first carrier is configured with no CORESET, a third RS of a first BWP of a second carrier is used, where the second carrier is different from the first carrier. The case in which an active BWP of the first carrier is not configured with a TCI that is in an activated state may specifically be understood as follows: TCIs configured for the active BWP of the first carrier are all in an inactive state, or the active BWP of the first carrier is configured with no TCI.

In an optional embodiment, the fifth RS includes at least one of the following:

a RS with the lowest identification number, where if the RS is a synchronization signal block SSB, the identification number of the RS is SSB-Index; and if the RS is a channel state information reference signal CSI-RS, the identification number of the SSB is CSI-RS-Index;

a RS with the highest identification number, where if the RS is a synchronization signal block SSB, the identification number of the RS is SSB-Index; and if the RS is a channel state information reference signal CSI-RS, the identification number of the SSB is CSI-RS-Index;

a RS in QCL information of a CORESET with the lowest identification number in CORESETs used for determining a current resource beam;

a RS in QCL information of a CORESET with the highest identification number in CORESETs used for determining a current resource beam;

a RS in a TCI state with the lowest identification number in all TCI states or activated TCI states; or a RS in a TCI state with the highest identification number in all TCI states or activated TCI states.

The RS in the TCI state with the lowest identification number and the RS in the TCI state with the highest identification number are used when no CORESET has been configured.

In an optional embodiment, the SSB in which the terminal is located includes at least one of the following:

a SSB for receiving current broadcast information; or a SSB corresponding to a CORESET with identification number 0.

In an optional embodiment, the first RS is a RS of a beam usable for the current transmission in any one of the following cases:

a RS of a beam used for the current transmission is a pathloss reference reference signal configured by radio resource control RRC signaling;

a RS of a beam used for the current transmission is a pathloss reference reference signal that is configured by RRC signaling and activated or updated by a MAC CE;

the number of RSs corresponding to a beam usable for the current transmission is less than or equal to K;

a sum of the number of RSs corresponding to a beam usable for the current transmission and the number of pathloss reference reference signals configured by RRC signaling is less than or equal to K;

a RS of a beam used for the current transmission is a pathloss reference reference signal configured by radio resource control RRC signaling, and the number of RSs corresponding to a beam usable for the current transmission is less than or equal to K;

a RS of a beam used for the current transmission is a pathloss reference reference signal configured by radio resource control RRC signaling, and a sum of the number of RSs corresponding to a beam usable for the current transmission and the number of pathloss reference reference signals configured by RRC signaling is less than or equal to K;

a RS of a beam used for the current transmission is a pathloss reference reference signal that is configured by RRC signaling and activated or updated by a MAC CE, and the number of RSs corresponding to a beam usable for the current transmission is less than or equal to K; and a RS of a beam used for the current transmission is a pathloss reference reference signal that is configured by RRC signaling and activated or updated by a MAC CE, and a sum of the number of RSs corresponding to a beam usable for the current transmission and the number of pathloss reference reference signals configured by RRC signaling is less than or equal to K.

Optionally, a value of K is 4. Certainly, the value of K is not limited to 4, and may be alternatively set to another value according to needs.

Further, in the foregoing solutions in which a first RS from historical downlink RSs is determined as the pathloss reference reference signal, none of the PUCCH, PUSCH and SRS is configured with the pathloss reference reference signal.

Further, in a case that no target parameter has been configured in the power control parameters of the target object, the determining, based on a historical configuration and/or protocol specification, the target parameter of the target object includes:

in a beam correspondence scenario, in a case that no target parameter has been configured in the power control parameters of the target object, determining, based on the historical configuration and/or the protocol specification, the target parameter.

In an optional embodiment, in a case that the target object is selected from a PUCCH, a PUSCH or a SRS, and that the target parameter includes at least one of target receive power, pathloss compensation factor, or closed-loop power control, the determining, based on historical configuration information and/or protocol specification, the target parameter includes:

determining that the target parameter of the PUCCH is the same as the target parameter of a PUCCH corresponding to a target occasion; or determining that the target parameter of the SRS is the same as the target parameter of a SRS corresponding to a target occasion; where the target occasion is after an initial access and before a RRC configuration.

It should be understood that in this embodiment, when the target object is a PUCCH, the target parameter may be determined based on a PUCCH corresponding to a target occasion, in other words, the target receive power, pathloss compensation factor and closed-loop power control may be replaced with corresponding power control parameters of the PUCCH corresponding to the target occasion; and when the target object is a SRS, the target parameter may be determined based on a SRS corresponding to a target occasion, in other words, the target receive power, pathloss compensation factor and closed-loop power control may be replaced with corresponding power control parameters of the SRS corresponding to the target occasion.

In an optional embodiment, when the target object is selected from a PUCCH, a PUSCH or a SRS, the target parameter may be directly determined based on a parameter value specified by the protocol. For example, when the target parameter includes closed-loop power control, a value of the closed-loop power control is 0; and when the target parameter includes pathloss compensation factor, a value of the pathloss compensation factor is 1.

In an optional embodiment, when the target object is selected from the PUCCH and the SRS, and the target parameter includes target receive power P0, P0 may be calculated in the following manner:

$P_O = P_{O\_PRE} + \Delta_{PREAMBLE\text{-}Msg3}$, where parameters preambleReceivedTargetPower ($P_{O\_PRE}$) and msg3-DeltaPreamble ($\Delta_{PREAMBLE\text{-}Msg3}$) may be provided by higher layers; and if the higher layers do not provide the msg3-DeltaPreamble parameter for the current carrier, then $\Delta_{PREAMBLE\text{-}Msg3}$ is equal to 0. msg3-DeltaPreamble is a power offset between msg3 and RACH sequence transmission and configured by high layers. preambleReceivedTargetPower is a target power value of a RACH sequence that is configured by higher layers and that the network expects to receive.

In an optional embodiment, when the target object is selected from the PUCCH and the SRS, and the target parameter includes pathloss compensation factor, the pathloss compensation factor may be calculated in the following manner:

if msg3-Alpha is configured by the higher layer signaling, the pathloss compensation factor is a value of the msg3-Alpha; otherwise, the pathloss compensation factor is 1.

In an optional embodiment, when the target object is selected from the PUCCH and the SRS, and the target parameter includes closed-loop power control, the closed-loop power control may be calculated in the following manners:

$$f = \Delta P_{rampup,b,f,c} + \delta_{msg2,b,f,c},$$

where $\delta_{msg2,b,f,c}$ is a transmit power control (TPC) command value indicated in the random response grant of a random response message corresponding to carrier f of serving cell c in which a current active uplink BWP is located;

$$\Delta P_{rampup,b,f,c} = \min\left\{\left|\max\left\{0, P_{CMAX,f,c} - \begin{pmatrix} 10\log_{10}(2^\mu \cdot M_{RB,b,f,c}^{PUSCH}(0)) + \\ P_{O\_PUSCH,b,f,c}(0) + \\ \alpha_{b,f,c}(0) \cdot PL_c + \\ \Delta_{TF,b,f,c}(0) + \\ \delta_{msg2,b,f,c} \end{pmatrix}\right\}\right|, \Delta P_{rampuprequested,b,f,c}\right\},$$

where $\Delta P_{rampuprequested,b,f,c}$ is provided by high layers, and corresponds to the total power ramp-up requested by higher layers from the first random access preamble to the last random access preamble for carrier f in the serving cell c in which the currently active BWP b is located;

$$\begin{pmatrix} 10\log_{10}(2^\mu \cdot M_{RB,b,f,c}^{PUSCH}(0)) + \\ P_{O\_PUSCH,b,f,c}(0) + \\ \alpha_{b,f,c}(0) \cdot PL_c + \\ \Delta_{TF,b,f,c}(0) + \\ \delta_{msg2,b,f,c} \end{pmatrix}$$

is a value of the initial access power; where
in the carrier f of the serving cell c in which the uplink current active BWP$^b$ is located, $M_{Rb,b,f,c}^{PUSCH}(0)$ is the bandwidth of the PUSCH resource assignment expressed in the number of resource blocks for the first PUSCH transmission on the current active uplink BWP$^b$;

$\Delta_{TF,b,f,c}(0)$ is the power adjustment of the first PUSCH transmission on the current active uplink BWP$^b$;

$\alpha_{b,f,c}(0)$ is the value of the pathloss compensation factor for msg3 PUSCH configured for the higher layer, or it is 0 if it is not configured for the higher layer;

$P_{O\_PUSCH,b,f,c}(0)$ is the target receive power;

$PL_c$ is a value of the pathloss calculation;

$\mu$ is a parameter for subcarrier spacing, that is, when the subcarrier spacing is N*15 KHz, $2^\mu$ is equal to N.

To better understand the implementation of the present invention, an example in which the network device has not configured the pathloss reference reference signal is used in the following for detailed description.

Specifically, when the network device does not give the pathloss reference reference signal in the power control parameters configured for the PUCCH or the SRS, the terminal may calculate the pathloss based on one of the following RSs.

Manner 1: Use the RS in the QCL information of the CORESET. Specifically, the downlink RS may be selected in the following manner.

Case 1: In a case that CORESET is configured for the current carrier (the first carrier in which the PUCCH or the SRS is located), manners 1.1 to 1.3 are included.

Manner 1.1: Use the RS in the QCL information of the CORESET on a most recent occasion. Further, the CORESET may have the highest CORESET ID or the lowest CORESET ID.

Manner 1.2: Use the RS in the QCL information of the CORESET #0. Further, it may be CORESET #0 on a most recent occasion.

Manner 1.3: Select from all downlink RSs associated with the CORESET in the active BWP of the current carrier.

For the manner 1.3, in an embodiment, it may be the RS with the lowest or highest RS ID. Further, if both the SSBs and the CSI-RSs exist, the selection is made preferentially in the SSBs, or the selection is made preferentially in the CSI-RSs, or the terminal itself decides whether to make a selection in the SSBs or the CSI-RSs preferentially. In another embodiment, it may be a RS that is selected randomly by the terminal. In another embodiment, it may alternatively be a RS on a most recent occasion.

Case 2: In a case that no CORESET is configured for the current carrier, manner 1.4 and manner 1.5 are included.

Manner 1.4: Use TCIs in an activated state (that is, activated TCI state) for the PDSCH on the active BWP of the current carrier. Optionally, a TCI with the highest identification number or the lowest identification number in the TCIs in an activated state (that is, activated TCI state with lowest/highest ID) may be used; or a TCI on a most recent occasion in the TCIs in an activated state may be used.

Manner 1.5: In a case that there is no activated TCI state on the active BWP of the current carrier, or no matter whether there is an activated TCI state on the active BWP of the current carrier or not, a specific RS of a specific BWP of a specific carrier is used.

Optionally, the specific carrier may include: a carrier of the primary cell or a carrier with the lowest ID or a carrier with the highest ID.

Optionally, the specific BWP includes at least one of an active BWP, an initial BWP, a BWP with the lowest identification number (lowest ID BWP), or a BWP with the highest identification number (highest ID BWP), or may also include all BWPs, that is, there is no restriction on the BWPs.

Optionally, the specific RS may include any one of the following:
- a RS in QCL information of CORESET #0;
- a RS in QCL information of a CORESET with the highest or lowest identification number;
- one of all downlink RSs associated with the CORESET configured for the first BWP, where, for example, the RS may be the RS with the highest RS ID or the lowest RS ID, or a RS selected by the terminal; it should be understood that when selecting the RS with the highest RS ID or the lowest RS ID, the selection can be made according to the priorities of the SSB and CSI-RS, for example, when the priority of the SSB is higher than the priority of the CSI-RS, the SSB with the highest or lowest SSB ID may be selected as the specific RS, or when the priority of the CSI-RS is higher than the priority of the SSB, the CSI-RS with the highest or lowest CSI-RS ID may be selected as the specific RS;
- a RS in the TCI with the highest identification number or the lowest identification number in all TCIs used for the PDSCH;
- a RS in the TCI with the highest identification number or the lowest identification number in activated TCIs for the PDSCH; and
- a RS in a recently used activated TCI for the PDSCH.

Optionally, the specific RS should satisfy the RS on a most recent occasion. In other words, the specific RS is one of all downlink RSs associated with the CORESET recently configured for the first BWP; or the specific RS is a RS in the TCI with the highest identification number or the lowest identification number in all TCIs configured for the first BWP for the PDSCH; or the specific RS is a RS in the TCI with the highest identification number or the lowest identification number in TCIs in an activated state that are recently configured for the first BWP for the PDSCH.

Manner 2: One of several RSs associated with space-related information of the PUCCH or the SRS.

In an embodiment, the RS may be one of the RS with the highest or lowest RS ID in the corresponding RSs. If the RS is a synchronization signal block SSB, the RS identification number is SSB-Index. If the RS is a channel state information reference signal CSI-RS, the RS identification number is CSI-RS-Index.

In another embodiment, the RS may alternatively be a RS configured in the QCL information of the CORESET with a corresponding lowest or highest CORESET ID in the CORESETs for determining the space-related information. Further, the RS may be a RS configured in the QCL information of the CORESET with the lowest CORESET ID or the highest CORESET ID in the CORESETs configured on a most recent occasion.

In another embodiment, the RS may alternatively be a RS with the lowest TCI state ID or the highest TCI state ID in the corresponding TCIs for the PDSCH. Optionally, a range for selecting the TCI for the PDSCH is all TCI states or activated TCI states. Further, the RS is used when the first carrier is not configured with the CORESET for determining the space-related information.

Manner 3: A downlink RS in the QCL information for scheduling the PUCCH or the PDCCH of the SRS.

Manner 4: A downlink RS associated with a latest physical random access channel PRACH.

Manner 5: If the PUCCH or SRS is scheduled by a RAR uplink grant, the pathloss calculation is based on a downlink RS associated with a corresponding PRACH.

Manner 6: A SSB in which the terminal is located refers to a SSB for receiving current broadcast information, or a SSB corresponding to CORSET 0.

Manner 7: A RS of a beam used for a current transmission.

Optionally, only when the RS is a PL RS configured by RRC, or a PL RS that is configured by RRC and activated and/or updated by a MAC CE. Optionally, only when the number of RSs corresponding to a beam usable for the current transmission is less than or equal to K, or a sum of the number of RSs and the number of PL RSs configured by RRC is less than or equal to K, where, when calculating the number of PL RSs, it is necessary to remove duplicated RSs. Optionally, K is equal to 4.

FIG. 3 is a structural diagram of a terminal according to an embodiment of the present invention. As shown in FIG. 3, the terminal 300 includes:
- a determining module 301, configured to, in a case that no target parameter has been configured in power control parameters of a target object, determine a target parameter of the target object in any one of the following manners:
- determining, based on a target parameter of another object configured by a network device, the target parameter of the target object, where the another object is different from the target object;
- determining, based on a historical configuration, the target parameter of the target object; and
- determining, based on protocol specification, the target parameter of the target object; where
- the target object and the another object are selected from a physical uplink control channel PUCCH, a physical uplink shared channel PUSCH, and a sounding reference signal SRS; and the target parameter includes at least one of pathloss reference reference signal, target receive power, pathloss compensation factor, or closed-loop power control.

Optionally, in a case that the target parameter includes the pathloss reference reference signal, the determining, based on a target parameter of another object apart from the target object, a target parameter of the target object includes:
- determining a first pathloss reference reference signal of the another object as a pathloss reference reference signal of the target object.

Optionally, the first pathloss reference reference signal is any one of the following:
- a pathloss reference reference signal with the lowest identification number in the pathloss reference reference signals of the another object;
- a pathloss reference reference signal with the highest identification number in the pathloss reference reference signals of the another object;
- a pathloss reference reference signal used on a most recent occasion in the pathloss reference reference signals of the another object;
- a pathloss reference reference signal with the lowest identification number activated or updated by a media access control control element MAC CE in the pathloss reference reference signals of the another object;
- a pathloss reference reference signal with the highest identification number activated or updated by a MAC CE in the pathloss reference reference signals of the another object; and
- a pathloss reference reference signal that is activated or updated by a MAC CE and used on a most recent occasion in the pathloss reference reference signals of the another object.

Optionally, if the number of pathloss reference reference signals of the another object is less than or equal to a preset threshold, the first pathloss reference reference signal is any one of the following:
  the pathloss reference reference signal with the lowest identification number in the pathloss reference reference signals of the another object;
  the pathloss reference reference signal with the highest identification number in the pathloss reference reference signals of the another object; and
  the pathloss reference reference signal used on a most recent occasion in the pathloss reference reference signals of the another object.

Optionally, if the number of pathloss reference reference signals of the another object is greater than a preset threshold, the first pathloss reference reference signal is any one of the following:
  the pathloss reference reference signal with the lowest identification number activated or updated by a MAC CE in the pathloss reference reference signals of the another object;
  the pathloss reference reference signal with the highest identification number activated or updated by a MAC CE in the pathloss reference reference signals of the another object; and
  the pathloss reference reference signal that is activated or updated by a MAC CE and used on a most recent occasion in the pathloss reference reference signals of the another object.

Optionally, if the number of pathloss reference reference signals that are activated or updated by a MAC CE and used on a most recent occasion is greater than 1, the first pathloss reference reference signal is any one of the following:
  a pathloss reference reference signal with the lowest identification number in the pathloss reference reference signals that are activated or updated by a MAC CE and used on a most recent occasion; and
  a pathloss reference reference signal with the highest identification number in the pathloss reference reference signals that are activated or updated by a MAC CE and used on a most recent occasion.

Optionally, if the number of the another objects is greater than 1, a pathloss reference reference signal of one or two objects is selected according to preset first priority information as the pathloss reference reference signal of the target object, where the first priority information is obtained in any one of the following manners:
  being specified by a protocol;
  being configured by a network device; and
  being configured by a terminal.

Optionally, the pathloss reference reference signal is associated with a synchronization signal block and a channel state information reference signal. The pathloss reference reference signal of the target object is determined based on preset second priority information. The pathloss reference reference signal of the target object is selected from the synchronization signal block and the channel state information reference signal. The second priority information is obtained in any one of the following manners:
  being specified by a protocol;
  being configured by a network device; and
  being configured by a terminal.

Optionally, an identifier of the pathloss reference reference signal is any one of the following:
  an identifier SSB-Index of the synchronization signal block SSB;
  an identifier CSI-RS-Index of the channel state information reference signal CSI-RS;
  a PUSCH pathloss reference reference signal identifier PUSCH-PathlossReferenceRS-Id, if the pathloss reference reference signal is a PUSCH pathloss reference reference signal;
  a PUCCH pathloss reference reference signal identifier PUCCH-PathlossReferenceRS-Id, if the pathloss reference reference signal is a PUCCH pathloss reference reference signal;
  a SRS resource identifier SRS-ResourceId, if the pathloss reference reference signal is a SRS pathloss reference reference signal; and
  a SRS resource set identifier SRS-ResourceSetId, if the pathloss reference reference signal is a SRS pathloss reference reference signal.

Optionally, in a case that the target parameter includes the pathloss reference reference signal, the determining, based on a historical configuration and/or protocol specification, the target parameter of the target object includes:
  determining a first RS from historical downlink reference signals RSs as the pathloss reference reference signal.

Optionally, the first RS is any one of the following:
  a downlink RS in quasi co-location QCL information associated with the target object;
  a fifth RS in a plurality of RSs for determining a transmit beam corresponding to a current resource;
  a SSB in which the terminal is located;
  a RS of a beam used for a current transmission;
  a downlink RS in QCL information of a target physical downlink control channel PDCCH, where the target PDCCH is a PDCCH for scheduling the target object;
  a downlink RS associated with a latest physical random access channel PRACH; and
  a downlink RS associated with a PRACH corresponding to a random access response RAR, where the random access response RAR is used for scheduling the target object.

Optionally, the target object is located in a first carrier, and the downlink RS in quasi co-location QCL information associated with the target object includes any one of the following:
  in a case that the first carrier is configured with control resource sets CORESETs, a downlink RS in QCL information of a first CORESET, where the first CORESET is one of the CORESETs configured for the first carrier;
  in a case that the first carrier is configured with no CORESET, and that an active bandwidth part BWP of the first carrier is configured with M transmission configuration indicators TCIs for PDSCH, a downlink RS in a first TCI, where the first TCI is one of the M TCIs, the M TCIs are in an activated state, and M is a positive integer;
  in a case that the first carrier is configured with no CORESET, and that an active BWP of the first carrier is not configured with a TCI that is in an activated state, a third RS of a first BWP of a second carrier, where the second carrier is different from the first carrier; and
  in a case that the first carrier is configured with no CORESET, the third RS of the first BWP of the second carrier, where the second carrier is different from the first carrier.

Optionally, the first CORESET includes any one of the following:
  a CORESET configured for the first carrier on a most recent occasion; and a CORESET with identification number 0 in the CORESETs configured for the first carrier.

Optionally, the CORESET configured for the first carrier on a most recent occasion includes:
   a CORESET with the lowest identification number or the highest identification number in the CORESETs configured for the first carrier on a most recent occasion.

Optionally, the downlink RS in the QCL information of the first CORESET includes:
   a second RS in N1 downlink RSs, where N1 is a positive integer, and the N1 downlink RSs are associated with a CORESET configured for an active BWP of the first carrier.

Optionally, the second RS includes any one of the following:
   a RS with the lowest identification number or the highest identification number, where if the RS is a synchronization signal block SSB, the identification number of the RS is SSB-Index;
   and if the RS is a channel state information reference signal CSI-RS, the identification number of the SSB is CSI-RS-Index;
   in a case that the downlink RS includes SSBs and CSI-RSs, a SSB with the lowest identification number or the highest identification number, where a priority of the SSB is higher than that of the CSI-RS;
   in a case that the downlink RS includes SSBs and CSI-RSs, a CSI-RS with the lowest identification number or the highest identification number, where a priority of the SSB is lower than that of the CSI-RS; and a RS that is randomly selected from the N1 downlink RSs.

Optionally, the first TCI is a TCI with the lowest identification number or the highest identification number in the M TCIs.

Optionally, the second carrier includes at least one of a current carrier, a carrier of a primary cell, a carrier with the lowest identification number, or a carrier with the highest identification number.

Optionally, the first BWP includes at least one of an active BWP, an initial BWP, a BWP with the lowest identification number, or a BWP with the highest identification number.

Optionally, the third RS includes any one of the following:
   a RS in QCL information of a third CORESET, where the third CORESET includes at least one of a CORESET with identification number 0, a CORESET with the lowest identification number, a CORESET with the highest identification number, or a CORESET selected by the terminal;
   a fourth RS in N2 downlink RSs, where N2 is a positive integer, and the N2 downlink RSs are associated with a CORESET configured for the first BWP; and
   a downlink RS in a fourth TCI, where the fourth TCI is a TCI with the lowest identification number or the highest identification number in L TCIs that are in an activated state, or a TCI that is recently used in the L TCIs, where L is a positive integer.

Optionally, the L TCIs are used for the PDSCH.

Optionally, the fifth RS includes at least one of the following:
   a RS with the lowest identification number, where if the RS is a synchronization signal block SSB, the identification number of the RS is SSB-Index; and if the RS is a channel state information reference signal CSI-RS, the identification number of the SSB is CSI-RS-Index;
   a RS with the highest identification number, where if the RS is a synchronization signal block SSB, the identification number of the RS is SSB-Index; and if the RS is a channel state information reference signal CSI-RS, the identification number of the SSB is CSI-RS-Index;
   a RS in QCL information of a CORESET with the lowest identification number in CORESETs used for determining a current resource beam;
   a RS in QCL information of a CORESET with the highest identification number in CORESETs used for determining a current resource beam;
   a RS in a TCI state with the lowest identification number in all TCI states or activated TCI states; or
   a RS in a TCI state with the highest identification number in all TCI states or activated TCI states.

Optionally, the RS in the TCI state with the lowest identification number and the RS in the TCI state with the highest identification number are used when no CORESET has been configured.

Optionally, the SSB in which the terminal is located includes at least one of the following:
   a SSB for receiving current broadcast information; or
   a SSB corresponding to a CORESET with identification number 0.

Optionally, the first RS is a RS of a beam usable for the current transmission in any one of the following cases:
   a RS of a beam used for the current transmission is a pathloss reference reference signal configured by radio resource control RRC signaling;
   a RS of a beam used for the current transmission is a pathloss reference reference signal that is configured by RRC signaling and activated or updated by a MAC CE;
   the number of RSs corresponding to a beam usable for the current transmission is less than or equal to K;
   a sum of the number of RSs corresponding to a beam usable for the current transmission and the number of pathloss reference reference signals configured by RRC signaling is less than or equal to K;
   a RS of a beam used for the current transmission is a pathloss reference reference signal configured by radio resource control RRC signaling, and the number of RSs corresponding to a beam usable for the current transmission is less than or equal to K;
   a RS of a beam used for the current transmission is a pathloss reference reference signal configured by radio resource control RRC signaling, and a sum of the number of RSs corresponding to a beam usable for the current transmission and the number of pathloss reference reference signals configured by RRC signaling is less than or equal to K;
   a RS of a beam used for the current transmission is a pathloss reference reference signal that is configured by RRC signaling and activated or updated by a MAC CE, and the number of RSs corresponding to a beam usable for the current transmission is less than or equal to K; and
   a RS of a beam used for the current transmission is a pathloss reference reference signal that is configured by RRC signaling and activated or updated by a MAC CE, and a sum of the number of RSs corresponding to a beam usable for the current transmission and the number of pathloss reference reference signals configured by RRC signaling is less than or equal to K.

Optionally, K is equal to 4.

Optionally, none of PUCCH, PUSCH and SRS is configured with the pathloss reference reference signal.

Optionally, in a case that no target parameter has been configured in the power control parameters of the target object, the determining, based on a historical configuration and/or protocol specification, the target parameter of the target object includes:

in a beam correspondence beam correspondence scenario, in a case that no target parameter has been configured in the power control parameters of the target object, determining, based on the historical configuration and/or the protocol specification, the target parameter.

Optionally, in a case that the target parameter includes at least one of target receive power, pathloss compensation factor, or closed-loop power control, the determining, based on historical configuration information and/or protocol specification, the target parameter includes:

determining that a target parameter of a target PUCCH is the same as the target parameter of a PUCCH corresponding to a target occasion;

determining that a target parameter of a target PUSCH is the same as the target parameter of a PUSCH corresponding to a target occasion; or determining that a target SRS is the same as the target parameter of a SRS corresponding to a target occasion; where the target occasion is after an initial access and before a RRC configuration.

Optionally, in a case that the target parameter includes closed-loop power control, a value of the closed-loop power control is 0.

Optionally, in a case that the target parameter includes pathloss compensation factor, a value of the pathloss compensation factor is 1.

Optionally, the PUCCH is a dedicated PUCCH.

The terminal provided in this embodiment of the present invention can implement the processes implemented by the terminal in the method embodiment in FIG. 2. To avoid repetition, details are not described herein again.

Figure 4:
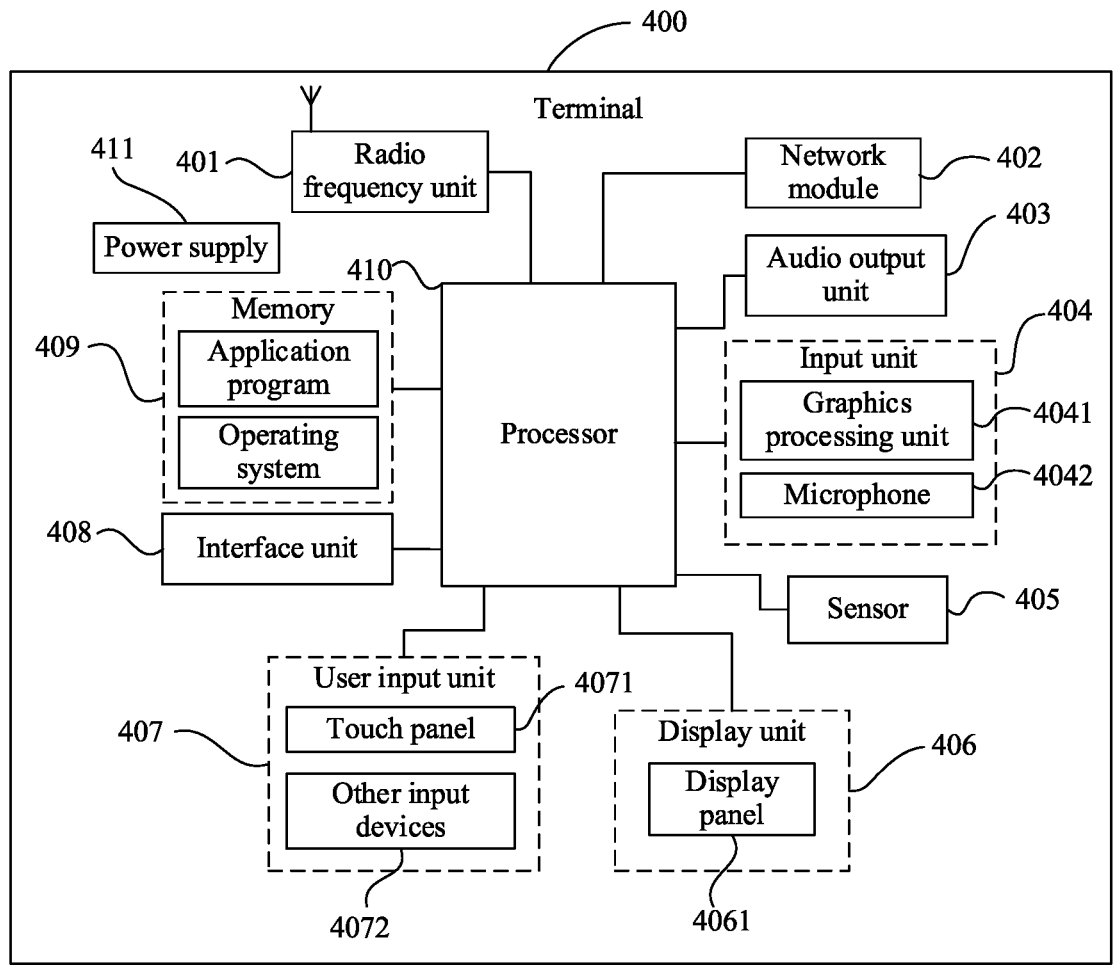
FIG. 4 is a structural diagram of another terminal according to an embodiment of the present invention.

FIG. 4 is a schematic diagram of a hardware structure of a terminal for implementing the embodiments of the present invention.

The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that the terminal structure shown in FIG. 4 does not constitute a limitation on the terminal. The terminal may include more or fewer components than those shown in the figure, or some components may be combined, or there may be a different component layout. In this embodiment of the present invention, the terminal includes but is not limited to a mobile phone, a tablet computer, a notebook computer, a palmtop computer, a vehicle-mounted terminal, a wearable device, a pedometer, or the like.

The processor 410 is configured to, in a case that no target parameter has been configured in power control parameters of a target object, determine a target parameter of the target object in any one of the following manners:

determining, based on a target parameter of another object configured by a network device, the target parameter of the target object, where the another object is different from the target object;

determining, based on a historical configuration, the target parameter of the target object; and determining, based on protocol specification, the target parameter of the target object; where the target object and the another object are selected from a physical uplink control channel PUCCH, a physical uplink shared channel PUSCH, and a sounding reference signal SRS; and the target parameter includes at least one of pathloss reference reference signal, target receive power, pathloss compensation factor, or closed-loop power control.

It should be understood that in this embodiment, the processor 410 and the radio frequency unit 401 can implement various processes that are implemented by the terminal in the method embodiment of FIG. 2. To avoid repetition, details are not described herein again.

It should be understood that in this embodiment of the present invention, the radio frequency unit 401 may be configured to receive and send signals during an information receiving and sending process or a call process. Specifically, the radio frequency unit 401 receives downlink data from a base station and delivers the downlink data to the processor 410 for processing; and in addition, the radio frequency unit 401 sends uplink data to the base station. Usually, the radio frequency unit 401 includes but is not limited to an antenna, at least one amplifier, a transceiver, a coupler, a low noise amplifier, a duplexer, and the like. In addition, the radio frequency unit 401 may further communicate with a network and another device by using a wireless communications system.

The terminal provides wireless broadband Internet access for a user by using the network module 402, for example, helping the user transmit and receive e-mails, browse web pages, and access streaming media.

The audio output unit 403 may convert audio data received by the radio frequency unit 401 or the network module 402 or stored in the memory 409 into an audio signal and output the audio signal as a sound. In addition, the audio output unit 403 may further provide an audio output (for example, a call signal reception sound or a message reception sound) related to a specific function performed by the terminal 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042. The graphics processing unit 4041 processes image data of a static picture or a video that is obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or transmitted by the radio frequency unit 401 or the network module 402. The microphone 4042 may receive sounds and process such sounds into audio data. The processed audio data can be converted into a format output that can be sent to a mobile communication base station through the radio frequency unit 401 in a telephone call mode.

The terminal 400 further includes at least one sensor 405, for example, an optical sensor, a motion sensor, and another sensor. Specifically, the optical sensor includes an ambient light sensor and a proximity sensor. The ambient light sensor may adjust brightness of a display panel 4041 based on intensity of ambient light. When the terminal 400 moves to an ear, the proximity sensor may turn off the display panel 4041 and/or backlight. As a motion sensor, an accelerometer sensor may detect magnitudes of accelerations in all directions (usually three axes), may detect a magnitude and a direction of gravity when the terminal is still, and may be applied to posture recognition (for example, landscape/portrait mode switching, a related game, or magnetometer posture calibration) of the terminal, a function related to vibration recognition (for example, a pedometer or a keystroke), or the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein.

The display unit 406 is configured to display information entered by the user or information provided for the user. The display unit 406 may include a display panel 4061, and the display panel 4061 may be configured in a form of a liquid crystal display (LCD), an organic light-emitting diode (OLED), or the like.

The user input unit 407 may be configured to receive input digit or character information and generate key signal input related to user setting and function control of the terminal. Specifically, the user input unit 407 includes a touch panel 4071 and other input devices 4072. The touch panel 4071 is also referred to as a touchscreen and may collect a touch operation (such as an operation performed by the user on the touch panel 4071 or near the touch panel 4071 with a finger or by using any proper object or accessory such as a stylus) of the user on or near the touch panel 4071. The touch panel 4071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 410, receives a command transmitted by the processor 410, and executes the command. In addition, the touch panel 4071 may be implemented in a plurality of types, for example, a resistive type, a capacitive type, an infrared type, and a surface acoustic wave type. In addition to the touch panel 4071, the user input unit 407 may further include the other input devices 4072. Specifically, the other input devices 4072 may include but are not limited to a physical keyboard, a function key (such as a volume control key or an on/off key), a trackball, a mouse, and a joystick. Details are not described herein.

Further, the touch panel 4071 may cover the display panel 4041. After detecting a touch operation on or near the touch panel 4071, the touch panel 4071 transmits the touch operation to the processor 410 to determine a type of a touch event. Then the processor 410 provides a corresponding visual output on the display panel 4041 based on the type of the touch event. In FIG. 4, the touch panel 4071 and the display panel 4041 serve as two separate components to implement input and output functions of the terminal. However, in some embodiments, the touch panel 4071 and the display panel 4041 may be integrated to implement the input and output functions of the terminal. This is not specifically limited herein.

The interface unit 408 is an interface for connecting an external apparatus to the terminal 400. For example, the external apparatus may include a wired or wireless headset port, an external power (or battery charger) port, a wired or wireless data port, a memory card port, a port for connecting an apparatus having an identification module, an audio input/output (I/O) port, a video I/O port, an earphone port, and the like. The interface unit 408 may be configured to receive an input (for example, data information and electric power) from the external apparatus, and transmit the received input to one or more elements in the terminal 400; or may be configured to transmit data between the terminal 400 and the external apparatus.

The memory 409 may be configured to store software programs and various data. The memory 409 may mainly include a program storage region and a data storage region. The program storage region may store an operating system, an application program required by at least one function (for example, an audio play function or an image play function), and the like. The data storage region may store data (for example, audio data or a phone book) created based on usage of the mobile phone. In addition, the memory 409 may include a high-speed random access memory, or may include a nonvolatile memory, for example, at least one magnetic disk storage device or a flash memory device, or other volatile solid-state storage device.

The processor 410 is a control center of the terminal, connects various parts of the entire terminal by using various interfaces and lines, and performs various functions and data processing of the terminal by running or executing a software program and/or a module stored in the memory 409 and invoking data stored in the memory 409, to perform overall monitoring on the terminal. The processor 410 may include one or more processing units. Preferably, an application processor and a modem processor may be integrated in the processor 410. The application processor primarily processes an operating system, user interfaces, application programs, and the like. The modem processor primarily processes radio communication. It can be understood that the modem processor may be alternatively not integrated in the processor 410.

The terminal 400 may further include a power supply 411 (such as a battery) that supplies power to components. Preferably, the power supply 411 may be logically connected to the processor 410 via a power supply management system, thereby implementing functions such as charging management, discharging management, and power consumption management via the power supply management system.

In addition, the terminal 400 includes some functional modules that are not shown. Details are not described herein.

Optionally, an embodiment of the present invention further provides a terminal, including a processor 410, a memory 409, and a computer program stored in the memory 409 and capable of running on the processor 410. When the computer program is executed by the processor 410, the processes in the foregoing embodiments of the method for determining a power control parameter are implemented, with the same technical effect achieved. To avoid repetition, details are not described herein again.

An embodiment of the present invention further provides a computer-readable storage medium, where the computer-readable storage medium stores a computer program. When the computer program is executed by a processor, the processes of the embodiments of the method for determining a power control parameter of the terminal side provided in the embodiments of the present invention are implemented, with the same technical effects achieved. To avoid repetition, details are not described herein again. The computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . ." does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The computer software product is stored in a storage medium (such as a ROM, a RAM, a magnetic disk, or an optical disc), and includes several instructions for instructing a terminal (which may be a mobile phone, a personal computer, a server, an air conditioner, a base station, or the like) to perform the methods described in the embodiments of the present invention.

It can be understood that the embodiments described in some embodiments of this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in this application, or a combination thereof.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A method for determining a power control parameter, applied to a terminal and comprising:
    in a case that no pathloss reference reference signal of a sounding reference signal (SRS) has been configured, determining, based on protocol specification, the pathloss reference reference signal of the SRS;
    wherein the determining, based on protocol specification, the pathloss reference reference signal of the SRS comprises:
    determining a first RS from configured downlink reference signals RSs as the pathloss reference reference signal;
    wherein the first RS is a downlink RS in quasi co-location (QCL) information associated with the SRS;
    wherein the SRS is located in a first carrier, and the downlink RS in the quasi co-location (QCL) information associated with the SRS comprises:
        in a case that the first carrier is configured with no CORESET, and that an active bandwidth part (BWP) of the first carrier is configured with M transmission configuration indicators (TCIs) for PDSCH, a downlink RS in a first TCI, wherein the first TCI is a TCI with the lowest identification number in the M TCIs, the M TCIs are in an active state, wherein M is a positive integer.

2. The method according to claim 1, wherein the method further comprises:
    in a case that the first carrier is configured with control resource sets (CORESETs), the downlink RS in the quasi co-location (QCL) information associated with the SRS comprises a downlink RS in QCL information of a first CORESET, wherein the first CORESET is one of the CORESETs configured for the first carrier.

3. The method according to claim 2, wherein the first CORESET comprises any one of the following:
    a CORESET configured for the first carrier on a most recent occasion; and
    a CORESET with identification number 0 in the CORESETs configured for the first carrier.

4. The method according to claim 3, wherein the CORESET configured for the first carrier on a most recent occasion comprises:
    a CORESET with the lowest identification number or the highest identification number in the CORESETs configured for the first carrier on a most recent occasion.

5. The method according to claim 2, wherein the downlink RS in the QCL information of the first CORESET comprises:
    a second RS in N1 downlink RSs, wherein N1 is a positive integer, and the N1 downlink RSs are associated with a CORESET configured for an active BWP of the first carrier.

6. The method according to claim 5, wherein the second RS comprises any one of the following:
    a RS with the lowest identification number or the highest identification number;
    in a case that the downlink RS comprises SSBs and CSI-RSs, a SSB with the lowest identification number or the highest identification number, wherein a priority of the SSB is higher than that of the CSI-RS;
    in a case that the downlink RS comprises SSBs and CSI-RSs, a CSI-RS with the lowest identification number or the highest identification number, wherein a priority of the SSB is lower than that of the CSI-RS; and
    a RS that is randomly selected from the N1 downlink RSs.

7. A terminal, comprising a memory, a processor, and a program stored in the memory and capable of running on the processor, wherein when the program is executed by the processor, the following steps are implemented:
    in a case that no pathloss reference reference signal of a sounding reference signal (SRS) has been configured, determining, based on protocol specification, the pathloss reference reference signal of the SRS;
    wherein the determining, based on protocol specification, the pathloss reference reference signal of the SRS comprises:
    determining a first RS from configured downlink reference signals RSs as the pathloss reference reference signal;
    wherein the first RS is a downlink RS in quasi co-location (QCL) information associated with the SRS;
    wherein the SRS is located in a first carrier, and the downlink RS in the quasi co-location (QCL) information associated with the SRS comprises:
        in a case that the first carrier is configured with no CORESET, and that an active bandwidth part (BWP) of the first carrier is configured with M transmission configuration indicators (TCIs) for PDSCH, a downlink RS in a first TCI, wherein the first TCI is a TCI with the lowest identification number in the M TCIs, the M TCIs are in an active state, wherein M is a positive integer.

8. The terminal according to claim 7, wherein when the program is executed by the processor, the following steps are further implemented:
in a case that the first carrier is configured with control resource sets (CORESETs), the downlink RS in the quasi co-location (QCL) information associated with the SRS comprises a downlink RS in QCL information of a first CORESET, wherein the first CORESET is one of the CORESETs configured for the first carrier.

9. The terminal according to claim 8, wherein the first CORESET comprises any one of the following:
a CORESET configured for the first carrier on a most recent occasion; and
a CORESET with identification number 0 in the CORESETs configured for the first carrier.

10. The terminal according to claim 9, wherein the CORESET configured for the first carrier on a most recent occasion comprises:
a CORESET with the lowest identification number or the highest identification number in the CORESETs configured for the first carrier on a most recent occasion.

11. The terminal according to claim 8, wherein the downlink RS in the QCL information of the first CORESET comprises:
a second RS in N1 downlink RSs, wherein N1 is a positive integer, and the N1 downlink RSs are associated with a CORESET configured for an active BWP of the first carrier.

12. The terminal according to claim 11, wherein the second RS comprises any one of the following:
a RS with the lowest identification number or the highest identification number;
in a case that the downlink RS comprises SSBs and CSI-RSs, a SSB with the lowest identification number or the highest identification number, wherein a priority of the SSB is higher than that of the CSI-RS;
in a case that the downlink RS comprises SSBs and CSI-RSs, a CSI-RS with the lowest identification number or the highest identification number, wherein a priority of the SSB is lower than that of the CSI-RS; and
a RS that is randomly selected from the N1 downlink RSs.

13. A non-transitory computer-readable storage medium, wherein the computer-readable storage medium stores a computer program, and when the computer program is executed by a processor, the following steps are implemented:
in a case that no pathloss reference reference signal of a sounding reference signal (SRS) has been configured, determining, based on protocol specification, the pathloss reference reference signal of the SRS;
wherein the determining, based on protocol specification, the pathloss reference reference signal of the SRS comprises:
determining a first RS from configured downlink reference signals RSs as the pathloss reference reference signal;
wherein the first RS is a downlink RS in quasi co-location (QCL) information associated with the SRS;
wherein the SRS is located in a first carrier, and the downlink RS in the quasi co-location (QCL) information associated with the SRS comprises:
in a case that the first carrier is configured with no CORESET, and that an active bandwidth part (BWP) of the first carrier is configured with M transmission configuration indicators (TCIs) for PDSCH, a downlink RS in a first TCI, wherein the first TCI is a TCI with the lowest identification number in the M TCIs, the M TCIs are in an active state, wherein M is a positive integer.

14. The non-transitory computer-readable storage medium according to claim 13, wherein when the computer program is executed by the processor, the following steps are further implemented:
in a case that the first carrier is configured with control resource sets (CORESETs), the downlink RS in the quasi co-location (QCL) information associated with the SRS comprises a downlink RS in QCL information of a first CORESET, wherein the first CORESET is one of the CORESETs configured for the first carrier.

15. The non-transitory computer-readable storage medium according to claim 14, wherein the first CORESET comprises any one of the following:
a CORESET configured for the first carrier on a most recent occasion; and
a CORESET with identification number 0 in the CORESETs configured for the first carrier.

16. The non-transitory computer-readable storage medium according to claim 15, wherein the CORESET configured for the first carrier on a most recent occasion comprises:
a CORESET with the lowest identification number or the highest identification number in the CORESETs configured for the first carrier on a most recent occasion.

17. The non-transitory computer-readable storage medium according to claim 14, wherein the downlink RS in the QCL information of the first CORESET comprises:
a second RS in N1 downlink RSs, wherein N1 is a positive integer, and the N1 downlink RSs are associated with a CORESET configured for an active BWP of the first carrier.

18. The non-transitory computer-readable storage medium according to claim 17, wherein the second RS comprises any one of the following:
a RS with the lowest identification number or the highest identification number;
in a case that the downlink RS comprises SSBs and CSI-RSs, a SSB with the lowest identification number or the highest identification number, wherein a priority of the SSB is higher than that of the CSI-RS;
in a case that the downlink RS comprises SSBs and CSI-RSs, a CSI-RS with the lowest identification number or the highest identification number, wherein a priority of the SSB is lower than that of the CSI-RS; and
a RS that is randomly selected from the N1 downlink RSs.

* * * * *